No. 778,949. PATENTED JAN. 3, 1905.
H. M. BURKE.
STORM ROBE AND VEHICLE COVER.
APPLICATION FILED APR. 23, 1904.
2 SHEETS—SHEET 2.
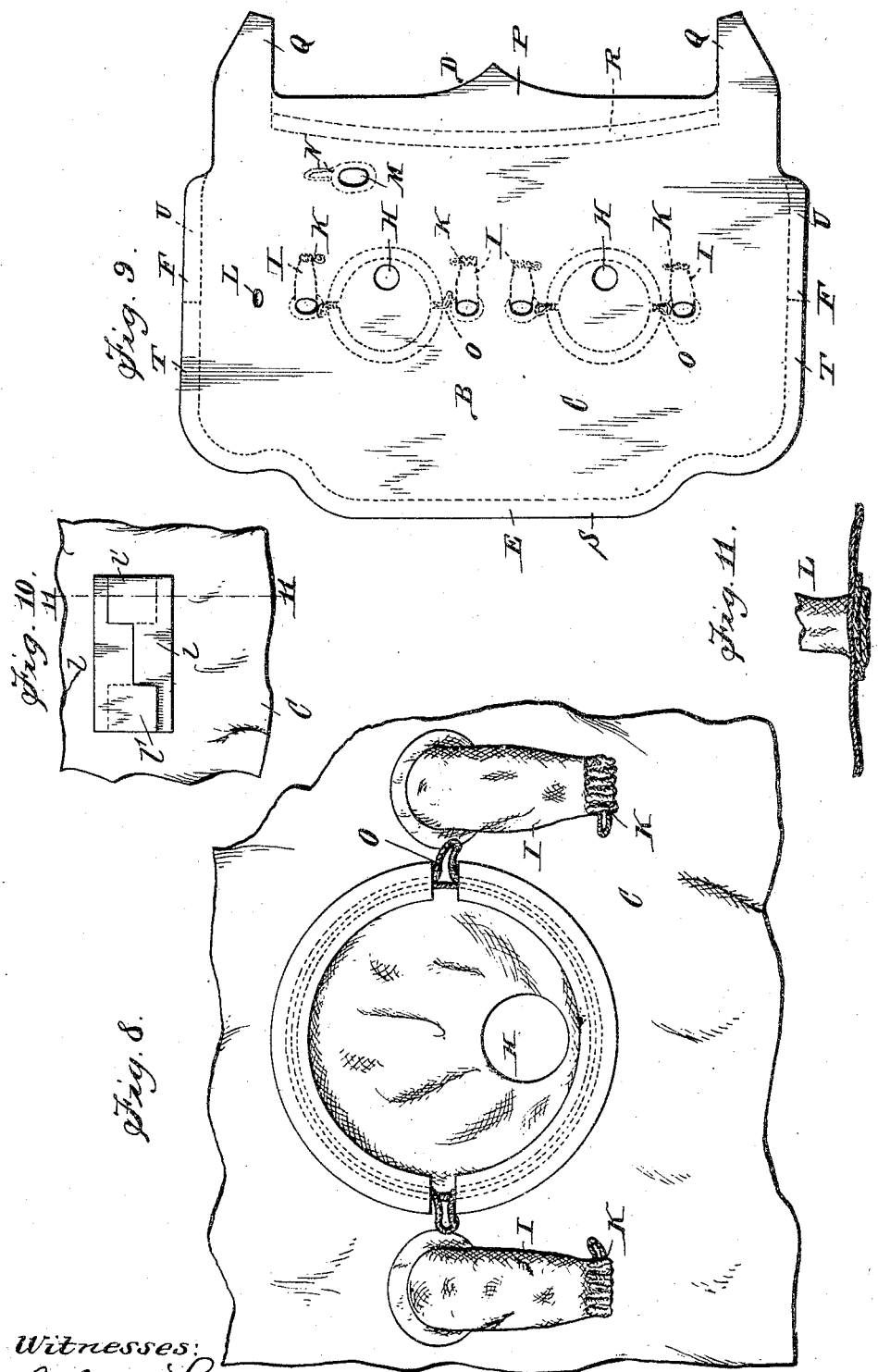
Witnesses:
Julius Lankes
Bert Mason
Henry M. Burke, Inventor.
By Neuhart & Burkhart, Attorneys.

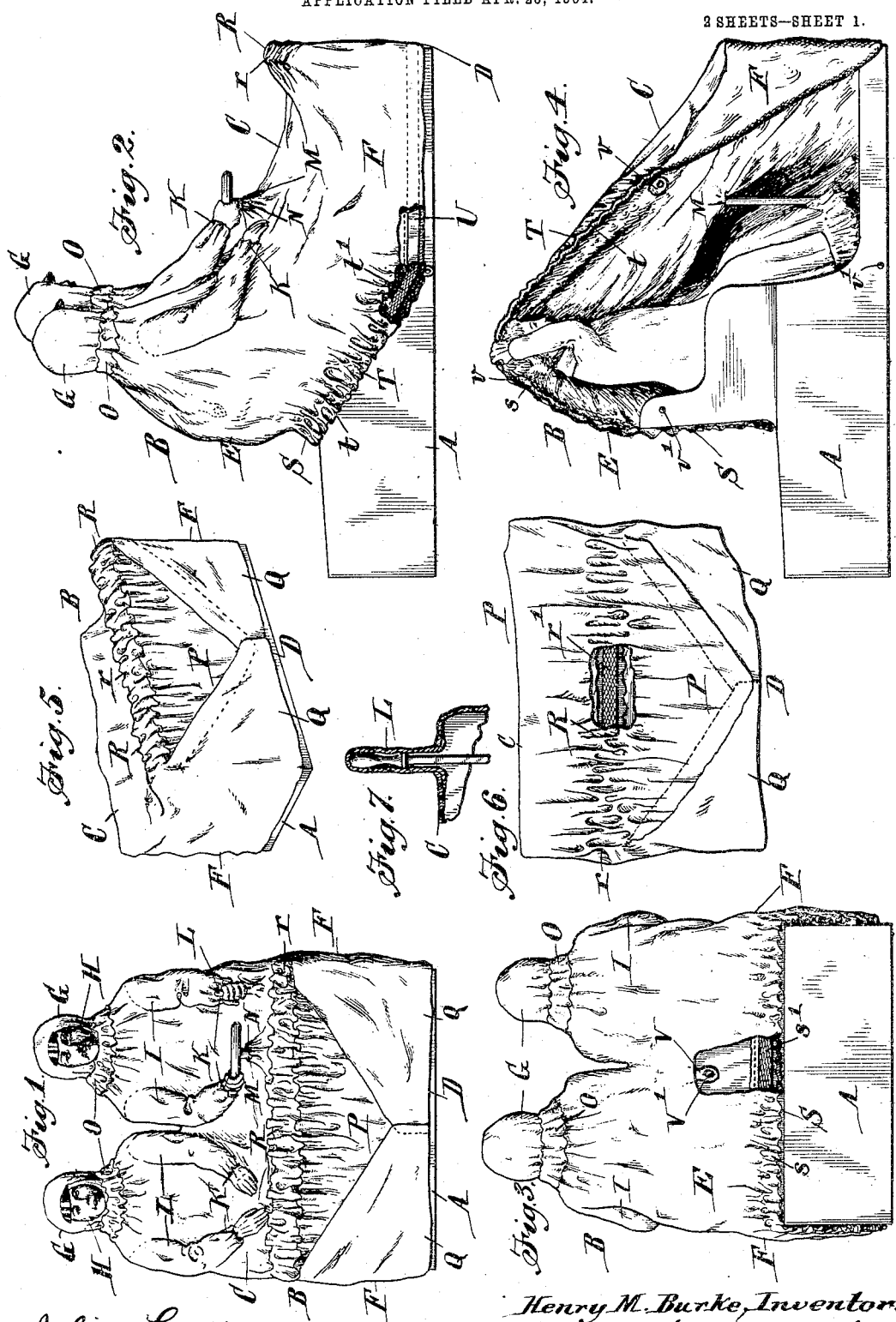

No. 778,949. Patented January 3, 1905.

UNITED STATES PATENT OFFICE.

HENRY M. BURKE, OF NIAGARA FALLS, NEW YORK.

STORM-ROBE AND VEHICLE-COVER.

SPECIFICATION forming part of Letters Patent No. 778,949, dated January 3, 1905.

Application filed April 23, 1904. Serial No. 204,613.

*To all whom it may concern:*

Be it known that I, HENRY M. BURKE, a citizen of the United States, residing at Niagara Falls, in the county of Niagara and State of New York, have invented certain new and useful Improvements in Storm-Robes and Vehicle-Covers, of which the following is a specification.

This invention relates to storm-covers for vehicles; and it has for its objects the production of a leakage-proof robe or cover that can be readily applied to a vehicle and removed from one side thereof without uncovering the other, to provide a storm-robe of one piece of material slitted and shirred so as to comprise sides, front, and rear portions, and a top portion providing integrally-formed hoods.

To these ends the invention consists in the provision within the cover of certain elastic regions, together with other details of construction, all of which will be described in the following specification and illustrated in the accompanying drawings, wherein—

Figure 1 represents a front elevation of a vehicle-body provided with the improved storm robe or cover. Fig. 2 is a side elevation of the same, with a portion of the fabric removed to show the junction of the side elastic and strap. Fig. 3 is a rear view thereof, with a portion of the fabric removed to show the rear fastening and rear elastic. Fig. 4 is a side elevation showing the position of the storm-robe when one of the occupants is about to leave the vehicle. Fig. 5 is a fragmentary perspective view of the front portion of the storm-robe applied to a vehicle. Fig. 6 is a fragmentary interior view of the front portion of the storm-robe, showing a portion of the fabric removed to indicate the front elastic. Fig. 7 is a fragmentary vertical section through one of the inverted pockets or sleeves, which receive the operating-levers. Fig. 8 is a plan view of a portion of the top of the robe, showing the hood portion unshirred. Fig. 9 is a view of the one-piece sheet forming the robe. Fig. 10 is a fragmentary interior view of a portion of the top of the robe, showing the manner of securing the inverted pockets to the robe. Fig. 11 is a section taken on line 11 11, Fig. 10.

The cover is intended especially for use with open-topped automobiles and has been illustrated as applied to the body of one of these vehicles; but it is obvious that it may be employed with other types of carriages and wagons.

A is the body of the vehicle, and B is the robe as a whole. The latter is made of one piece of waterproof material to avoid seams, and comprises a top portion C, a depending front portion D, adapted to cover the dashboard of the vehicle, a depending rear portion E, adapted to fit behind the seat, and depending side portions F, connecting the front and rear portions and intended to come well down on the sides of the body. The top portion is provided with hoods G, having openings H for the faces of the occupants, and with sleeves I, the wrists of which are embraced by drawstrings K, which afford a close fit around the wrists of the occupants, and an inverted pocket or sleeve L, adapted to receive the controlling-lever for actuating the mechanism of the machine. A suitable opening M for the steering-post is also provided, which is embraced by a draw-string N to afford a close fit around the said post. The necks of the hoods are embraced by draw-strings O, which afford a close fit around the necks of the occupants.

The hoods are formed by affixing to the sheet two semi-annular strips, between which latter and the sheet the draw-string O is inserted. Within the circular region formed by said strip at that side nearest the front end of the sheet the circular openings H are formed. On drawing the strings O the said circular regions form hoods G, the openings H facing forward. By this arrangement the hood is formed integrally with the robe proper and an absolutely leakage-proof robe is produced, the shirring of the hood rendering the same suitable for any person.

The inverted pocket L is formed with flaps $l$ at its inner end, which lie against the inner side of the top portion, and each flap has an overlapping extension $l'$, lying over the opposite flap. The flaps are cemented or glued to the robe proper and prevent leakage at this point.

Front portion D comprises three sections. One of these, P, is a continuation of the top portion, and the other two, Q Q, are prolongations of the side portions forming two flaps which are folded over section P and cemented or stitched to this section as well as to each other. The section P has an elastic region R along its upper edge, comprising a shirring $r$ and any suitable elastic material, (indicated by $r'$.) Rear portion E is provided with a similar elastic region S, extending transversely along its bottom and comprising shirring $s$ and elastic material $s'$. Each side portion F has a longitudinal elastic region T along its bottom, which, like the others, is composed of shirring $t$ and elastic material $t'$, and it is preferred that both shirring and elastic material form a continuation of the transverse elastic region of the rear portion. The elastic region in the rear and sides clasp the bottom of the cover about the body of the vehicle; but in order to preserve the shape of the cover the elastic region of each side portion is intended to extend only to about the middle thereof. The front portion of the cover is clasped to the top of the dashboard by means of the tension of the elastic region along its upper edge, while the tension applied along the bottom of the side portions from elastic regions T prevents the front portion from becoming loosened along its lower edge. In order to insure the application of the side tension directly to the lower edge of the front portion, there may be employed inelastic straps U, attached to the front ends of the elastic materials of the side portions and extending along the bottoms of these portions to the lower edges of the front portion.

The parts so far described permit of a ready attachment and removal of the cover, no separation of parts whatever being required in either operation. In order to allow one side of the robe to be raised without disturbing the other, a fastening V is secured to the middle of the inner face of the rear portion above its elastic region and is adapted to be attached to any suitable projection $V'$ on the seat-back. Whether fastenings along the side portions will be necessary depends largely upon the style of the vehicle on which the cover is used. They should be as few as possible and have been illustrated as two in number on each side comprising fastening $v$ on the bottom of the robe and projections $v'$ on the side of the seat and side of the body. These fastenings and projections, as well as fastening V and projection $V'$, may be of any desired construction.

The whole robe affords a covering that is peculiarly adapted for the rapid and easy adjustment necessary for articles of this description.

What is claimed as new is—

1. A storm-cover for vehicles comprising a top portion, a depending front portion adapted to cover the dashboard of a vehicle, a depending rear portion adapted to fit behind the seat thereof, and depending side portions connecting said front and rear portions; said rear portion having an elastic region extending transversely thereof, and each of said side portions being provided with a longitudinal elastic region connecting with the elastic region of the rear portion.

2. A storm-cover for vehicles formed in one piece and comprising a top portion, a depending front portion adapted to cover the dashboard of a vehicle, a depending rear portion adapted to fit behind the seat thereof, and depending side portions connecting said front and rear portions; combined with an elastic material extending transversely of the rear portion and longitudinally into the side portions.

3. A storm-cover for vehicles comprising a top portion, a depending front portion adapted to cover the dashboard of a vehicle and having a transverse elastic region, a depending rear portion adapted to fit behind the seat of the vehicle and having a transverse elastic region, and depending side portions each having a longitudinal elastic region.

4. A storm-cover for vehicles comprising a top portion, a depending front portion adapted to cover the dashboard of a vehicle and having a transverse elastic region along its upper edge, a depending rear portion adapted to fit behind the seat of the vehicle and having a transverse elastic region along its bottom, and depending side portions each having a longitudinal elastic region along its bottom connecting with the elastic region of the rear portion.

5. A storm-cover for vehicles comprising a top portion, a depending front portion adapted to cover the dashboard of a vehicle and having a transverse elastic region along its upper edge, a depending rear portion adapted to fit behind the seat of the vehicle, and depending side portions; combined with an elastic material extending across the bottom of the rear portion and along the bottom of each side portion to a point intermediate its length, and inelastic straps secured to the ends of said elastic material and extending along the bottom of the side portions to the lower edge of the front portion.

6. A storm-cover for vehicles comprising a top portion, a depending front portion adapted to cover the dashboard of a vehicle and having a transverse elastic region along its upper edge, a depending rear portion adapted to fit behind the seat of the vehicle and having its bottom shirred, and depending side portions, each having its bottom shirred from the rear thereof to a point intermediate its length; combined with an elastic material extending throughout the shirred bottoms of the rear and side portions, and inelastic straps secured to the ends of said elastic material and extending along the bottoms of the side portions to the lower edge of the front portions.

7. A storm-cover for vehicles formed of one sheet of material and comprising a top portion, a depending front portion adapted to cover the dashboard of a vehicle, a depending rear portion adapted to fit behind the seat thereof, and depending side portions connecting said front and rear portions; said rear portion having an elastic region extending transversely thereof and into the side portions.

8. A storm-cover for vehicles formed of one sheet of material having depending sides, a depending front portion adapted to cover the dashboard of a vehicle, a depending rear portion adapted to fit behind the seat thereof, and a hood for the head of the occupants of the vehicle, said hood being formed by cutting an opening in the robe and shirring the material around said opening.

9. A storm-robe for vehicles formed of one sheet of material, and having a hood formed by cutting an opening in said material and shirring the material around said opening.

10. A storm-robe for vehicles formed of one sheet of material and having an annular draw-string affixed thereto and an opening arranged eccentrically within the space bounded by said draw-string, the said space being adapted to be drawn together to form a hood.

11. A storm-cover for vehicles comprising a top portion, a depending front portion adapted to cover the dashboard of a vehicle, a depending rear portion adapted to fit behind the seat thereof and being provided with a transverse elastic region, and depending side portions connecting said front and rear portions and being provided with longitudinal elastic regions; combined with a fastening secured to the middle of the rear portion above the elastic region thereof and adapted to be attached to the seat of the vehicle.

12. A storm-cover for vehicles comprising a top portion, a depending front portion adapted to cover the dashboard of a vehicle and having a transverse elastic region along its upper edge, a depending rear portion adapted to fit behind the seat of the vehicle and having an elastic region along its bottom, and depending side portions, each having an elastic region along its bottom forming a continuation of the elastic region of the rear portion; combined with a fastening secured to the middle of the rear portion and suitable fastenings secured to the bottom of each side portion.

13. In a storm-robe, a casing for an operating-lever or the like comprising an inverted pocket passing outward through a slit in the robe and having its inner ends provided with flaps lying against the inner side of the robe, each flap having an extension lying over the opposite flap.

In testimony whereof I have affixed my signature in the presence of two subscribing witnesses.

HENRY M. BURKE.

Witnesses:
 EMIL NEUHART,
 M. SERVERT.